April 1, 1924.

J. W. SCHATZ

ANTIFRICTION BEARING

Filed June 1, 1922

1,489,013

INVENTOR
John W Schatz
BY
Phillips Abbott
ATTORNEY

Patented Apr. 1, 1924.

1,489,013

UNITED STATES PATENT OFFICE.

JOHN W. SCHATZ, OF POUGHKEEPSIE, NEW YORK.

ANTIFRICTION BEARING.

Application filed June 1, 1922. Serial No. 565,048.

*To all whom it may concern:*

Be it known that I, JOHN W. SCHATZ, a citizen of the United States, and a resident of the city of Poughkeepsie, county of Dutchess, and State of New York, have invented a new and useful Improvement in Antifriction Bearings, of which the following is a specification, reference being had to the accompanying drawings.

The use of antifriction bearings of various constructions has enormously extended during recent years, their adaptability to various forms of mechanism for the accomplishment of various results having been more and more recognized as the perfection in their manufacture and their reduced cost have from time to time developed, so that at the present time large numbers of such bearings are made annular in form and are employed under circumstances in which the shaft inner bearing or axis is stationary, and the bearing rotates about it, after the fashion of a wheel or roller, its annular exterior surface or periphery acting as the tread thereof. My invention, while useful in ball bearings adapted to various uses, more especially relates to bearings adapted to this latter use, and generally stated, it consists in so constructing the bearing that its parts shall be few, solid and enduring, and particularly that its outer peripheral part shall be of increased thickness, compared with bearings of the same class as heretofore made, so that its annular outer or peripheral surface shall be able to withstand long continued use and wear without such reduction in the thickness of metal and consequent strength as will result in weakening the bearing as a unit. My invention also contemplates the use of such weight or body of material in the outer annular casing or jacket of the bearing as that the wear-taking, or tread surface thereof shall be capable of case hardening, or equivalent treatment, and yet its inner portions remain sufficiently soft to permit of swaging, spinning or equivalent operations.

Referring to the drawings.

Figure 1:
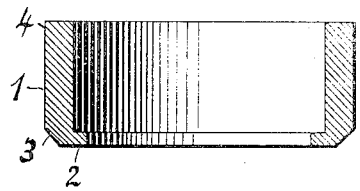
Figure 1 illustrates a sectional view of a ball bearing case, or so-called jacket, in an early stage of its construction.

In the drawings, 1 is the outer jacket or case of the bearing, it is usually, and preferably, made of steel and has a relatively thick body part as shown adapted to withstand much wear and heavy usage when used as a roller or wheel, as for instance in a factory carrier, as a wheel for invalid chairs, sliding door hangers, etc.

The jacket may be machined from a solid bar or stamped out of flat stock between suitable dies, and drawn to size and shape. In any case, however, there will be formed on one edge the flange or ledge 2, and I also prefer to chamfer off the edge adjacent to the flange as at 3, but that is not essential.

Owing to the thickness of the jacket it is difficult to crimp, roll, swage or spin from it a flange on the opposite side to correspond with the flange 2. Therefore, in order that this may be satisfactorily accomplished without danger of rupture of the metal and at reasonable cost, I remove in any preferred manner the excess metal at the edge 4 (see Fig. 1.) leaving only a relatively thin annular flange or projection 5 (see Fig. 2) and in so doing I prefer to chamfer off the edge of the jacket as at 6 to correspond with the chamfered off edge 3 on the opposite side.

Figure 2:
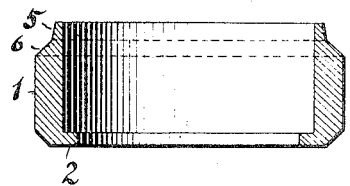
Figure 2 illustrates a sectional view similar to Figure 1, showing one edge of the jacket reduced in thickness and thus adapted to be turned down against the outer surface of the adjacent race ring.
Figure 3:
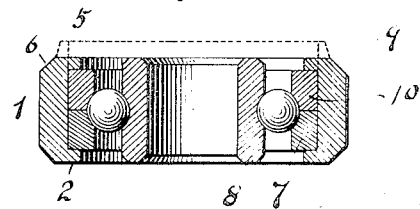
Figure 3 illustrates one form of my improved bearing assembled and constituting a complete, self-contained or unitary structure.

The jacket being now as shown in Figure 2, the bearing may be assembled as follows—one of the race rings 7 is placed in the jacket and pressed down snugly against the flange 2, the cone or inner race ring 8 with the balls 9 are then introduced, followed by the second race ring 10. Thereupon the bearing as thus far assembled, and while suitably supported is subjected to the operation of appropriate spinning, swaging or rolling mechanism whereby the relatively thin annular flange 5 is turned inwardly and pressed snugly against the outer surface of the race ring 10. Thus completing the structure as a self-contained unitary bearing all its parts being inseparably held in place by the two flanges 2 and 5, and the adjoining parts.

The bearing as now completed is as stated above adapted to many uses in the mechanic arts. When used however as a roller or wheel so that the peripheral surface of the jacket is subjected to wear, I prefer to harden it by a suitable case hardening or equivalent process many of which are now well known.

It will be obvious to those who are familiar with such matters that various departures may be made from the procedure above described by me and still the essential features of the invention be realized. Also that if preferred the metal may be suitably heated and then the jacket in the form shown in either Figure 1 or 2 may be struck up between suitable dies thus to some extent reducing cost. Also if desired both of the flanges 2 and 5 may be made by reducing the thickness of the metal at the edges of the jacket. Also, as above intimated, the special metal from which the jacket is made may be such as preferred, brass, malleable or steel casting, etc., may be used. I therefore do not limit myself in any respect.

I claim—

1. A jacket for a ball bearing having a relatively thick body part, an inwardly projecting flange on one edge and a laterally projecting flange of less thickness than the body part on the opposite edge, said flanges forming continuations of the jacket.

2. A jacket for a ball bearing having a relatively thick body part and flanges at the edges of the body part of less thickness than the body part which being bent inwardly, will form continuations of the jacket.

3. A ball bearing comprising an exterior annular jacket, suitable outer race rings, balls and inner race ring, the whole being held together as a self-contained unit by flanges integral with the jacket but of less thickness than it, which impinge upon the lateral outer surface of the outer race rings and form continuations of the jacket.

Signed this 27th day of May, 1922.

JOHN W. SCHATZ.